H. SMIT.
SURGICAL INSTRUMENT.
APPLICATION FILED OCT. 3, 1918.
1,293,565.
Patented Feb. 4, 1919.
2 SHEETS—SHEET 1.
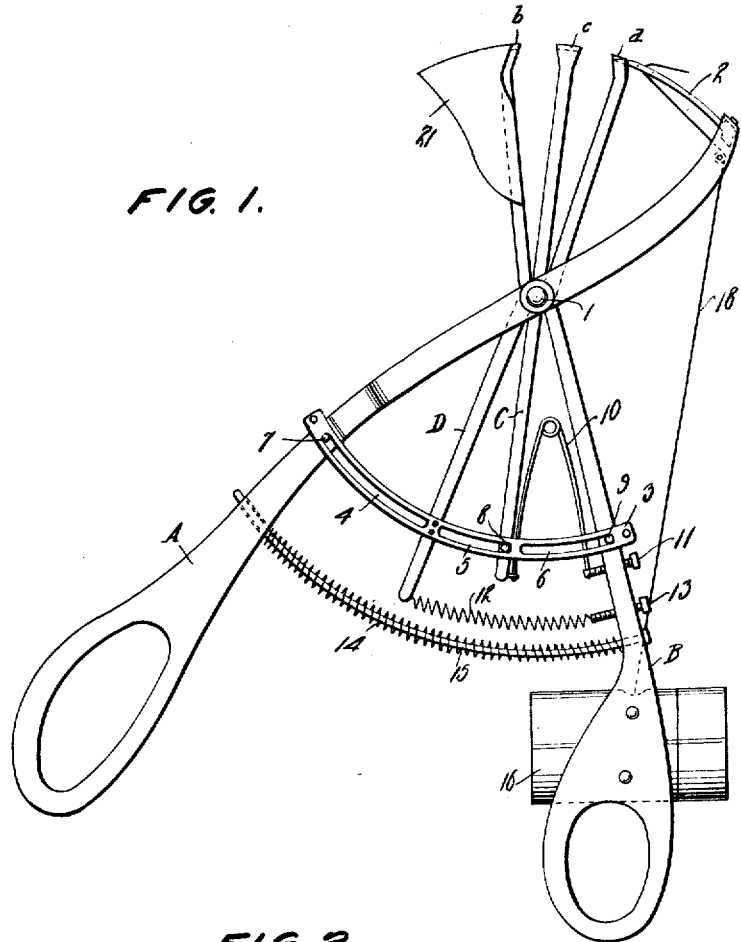
FIG. 1.
FIG. 2.
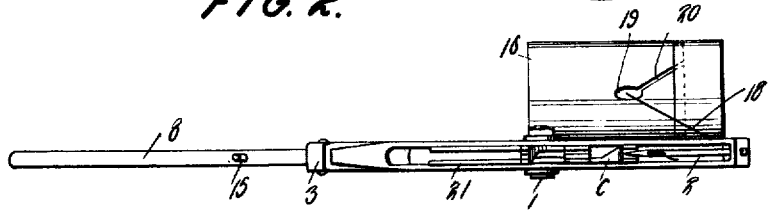
WITNESSES
W. C. Fielding
U. B. Hillyard
INVENTOR
Harry Smit
BY
[signature]
ATTORNEY H. SMIT.
SURGICAL INSTRUMENT.
APPLICATION FILED OCT. 3, 1918.
1,293,565.
Patented Feb. 4, 1919.
2 SHEETS—SHEET 2.
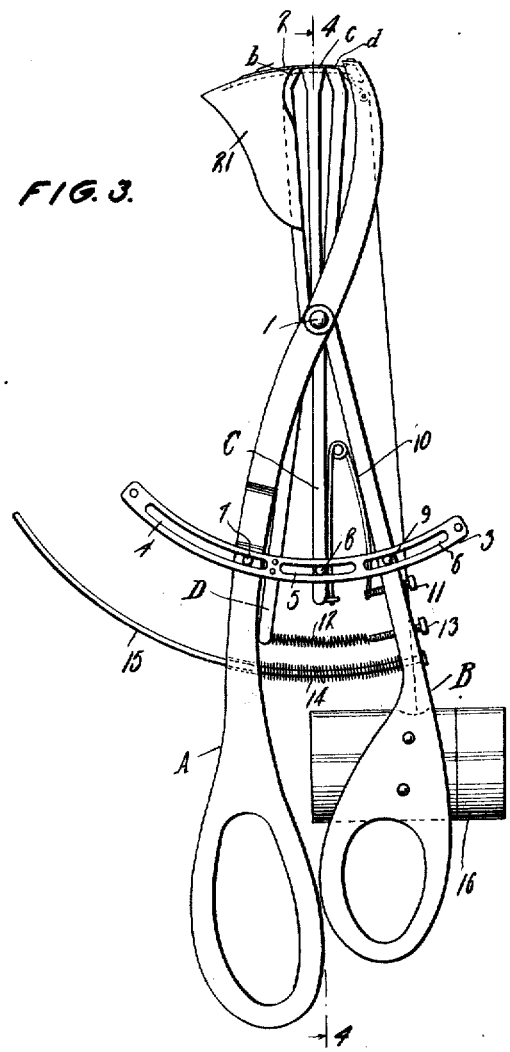
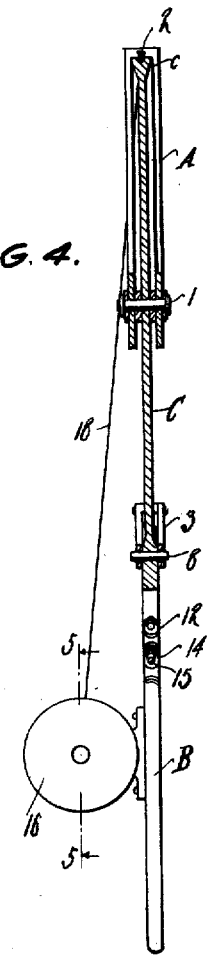
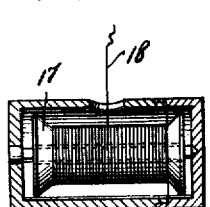
WITNESSES
W. C. Fielding.
V. B. Hillyard.
INVENTOR
Harry Smit
BY
Richard Bowen,
ATTORNEY

UNITED STATES PATENT OFFICE.

HARRY SMIT, OF NEW YORK, N. Y.

SURGICAL INSTRUMENT.

1,293,565.　　　　Specification of Letters Patent.　　Patented Feb. 4, 1919.

Application filed October 3, 1918. Serial No. 256,737.

*To all whom it may concern:*

Be it known that I, HARRY SMIT, a subject of the Queen of the Netherlands, residing at New York, in the county of New York and State of New York, have invented certain new and useful Improvements in Surgical Instruments, of which the following is a specification.

This invention has for its object to supply an instrument whereby the labor of the surgeon when stitching wounds, cuts, incisions, or the like is materially lessened, and the pain and inconvenience of the patient greatly reduced.

The invention provides an instrument which may be operated by one hand of the surgeon thereby leaving the remaining hand free for any purpose incident to the nature of the operation being performed, the instrument combining means for positively engaging opposite portions of the skin and directing the same together and holding such parts in position during the operation of stitching, the instrument being equipped with a needle which carries the thread through the parts while the latter are held securely in the drawn together position.

A further purpose of the invention is the provision of an instrument embodying a minimum number of parts, the same being of such construction and arrangement to admit of sterilization and the thorough cleaning so as to prevent any possible infection of the wound or cut to be stitched by use of the implement.

A further purpose of the invention is the provision of an instrument which may be manipulated solely by one hand, both when applying the same to the wound, cut, or like part to be stitched as well as drawing the parts together and during the operation of stitching the same.

The invention furthermore provides an instrument of the character specified to which is attached a receptacle for receiving the spool or bobbin containing the thread whereby the latter is conveniently at hand and prevented from becoming infected or fouled in any manner.

The invention also aims to provide an instrument for the use of any type or make of needle, the latter being detachably fitted to the instrument whereby the work of the surgeon may be facilitated and different types or styles of needle may be used in connection with the one instrument.

The drawing illustrates a preferred embodiment of the invention, however, it is to be understood that in adapting the same to meet different conditions, various changes in the form, proportion, and minor details of construction may be resorted to without departing from the nature of the invention as claimed hereinafter.

In the drawings:—

Figure 1 is a view in elevation of an instrument embodying the invention showing the relation of the parts when the several members are separated.

Fig. 2 is an end view of the instrument as seen when looking down thereon with the parts in the position shown in Fig. 1.

Fig. 3 is an elevation of the instrument with the several members closed and the needle in the position which it assumes when passed through the parts to be stitched.

Fig. 4 is a section on the line 4—4 of Fig. 3 looking to the right as indicated by the arrows.

Fig. 5 is a detail view through the holder for the spool or bobbin on the line 5—5 of Fig. 4.

Corresponding and like parts are referred to in the following description and indicated in all the views of the drawings by like reference characters.

The instrument comprises two main members A and B which cross each other and are pivotally connected by means of a rivet or like fastening 1. Each of the members A and B has its gripping end enlarged and formed with an opening to receive a digit of the hand after the fashion of a pair of scissors or shears. The members A and B cross each other near their outer or active ends so that when the ends gripped by the hand are pressed together the opposite ends are likewise pressed together so as to grip and draw together the parts to be stitched.

Members C and D are disposed between the members A and B and are mounted upon the same rivet or pivot fastening 1. The members C and D likewise cross so that when their inner ends are pressed together, their outer ends are likewise pressed together and this is necessary because of the peculiar construction and arrangement of the several parts. The outer ends of the several members A, B, C, and D project to a like distance from the pivot fastening 1 whereby they are enabled to act jointly in the performance of the required operation. The member C is straight and its outer end *c* is expansible to provide opposite jaws. The member D is offset and its outer end *d* is bent laterally toward the expanded end *c* of the member C so as to provide a coacting jaw. The outer end *b* of the member B is bent laterally toward the expanded end *c* of the member C to provide a jaw to coöperate with the jaw of the member C. The extremities of the members B, C, and D are notched to provide clearance for the needle 2 which is carried by the outer end of the member A. The needle 2 is curved in its length on the arc of a circle the center of which coincides with the pivot fastening 1 of the several members. The needle 2 is detachably connected with the member A to admit of its ready substitution by a needle or any make, type, or design as may be best suited to the requirements of the surgeon. The needle 2 has the eye near the point whereby the thread is carried through the parts to be stitched as the point of the needle is forced through such parts.

The members C and D are of less length than the members A and B. A curved bar 3 is secured about midway of its ends to the inner end of the member D. The bar 3 preferably comprises spaced parallel members as indicated most clearly in Figs. 2 and 4 of the drawings, the members embracing the several parts A, B, C, and D. A plurality of slots 4, 5, and 6 are formed in the curved bar 3 and receive pins 7, 8, and 9 attached to the respective members A, C, and B. The pins and slots limit the relative movements of the members when the instrument is open, as indicated most clearly in Fig. 1. A spring 10 is disposed between the inner ends of the members B and C and is of V-form and has its members connected to the members B and C. The spring 10 is of the contractile type and normally draws the inner ends of the members B and C together, thereby tending to bring the jaws *b* and *c* together to automatically grip the skin or other part disposed between them. The tension of the spring 10 is regulated by means of a set screw 11 threaded into the member B. A contractile helical spring 12 connects the inner end of the member D with the inner end of the member B and normally tends to draw the inner ends of such members together with the result that the outer end or jaw *d* of the member D is pressed toward the jaw *c* of the member C, this result taking place when the handle ends of the members A and B are pressed together. The tension of the spring 12 is adapted to be regulated by means of a set screw 13 threaded into the member B.

The handle ends of the members A and B are normally pressed apart by means of an expansible helical spring 14 which is mounted upon a curved rod 15 attached at one end to the member B and having its opposite end passing loosely through an opening formed in the member A. When the handle ends of the members A and B are pressed together, the spring 14 is compressed and the springs 10 and 12 are free to act whereby the outer end *c* of the member C is pressed toward the jaw *b* of the member B, and whereby the jaw *d* of the member D is pressed toward the jaw *c* of the member C.

A casing 16 is attached to one of the members as D and is adapted to receive a spool or bobbin 17 containing the thread 18. An opening 19 is formed in a side of the casing 16 and a slot 20 leads from the opening 19 outward and facilitates the threading of the casing when placing the spool or bobbin therein or when it becomes necessary to pass the thread 18 through the opening 19.

A guard 21 is applied to the outer end of the member D and forms a shield for the point of the needle after the latter is passed through the parts to be stitched and while the needle is passing through such parts. While the guard 21 shields the point of the needle, it does not obstruct the eye or the thread so that the latter is readily accessible to be engaged by a pair of forceps or other instrument when the device is in service so that the stitching may be properly effected.

In the operation of the instrument, the surgeon after threading the needle 2 grasps the handle ends of the members A and B, a digit of the hand passing through the openings in the gripping ends of such members. The instrument is adjusted so that the jaw *c* of the member C enters the wound, incision, or cut a slight distance to insure the jaws *b* and *d* of the members B and D engaging with the skin at the sides of the wound or cut. After the instrument has been thus adjusted, the handle ends of the members A and B are pressed together with the result that the jaws *b* and *d* close against the twin jaw *c* thereby gripping the skin and drawing the same together. A continued closing movement of the members A and B causes the needle 2 to pass through the edges of the skin which are thus stitched.

Upon relaxing the members, the thread carried through the skin is slackened, thereby enabling the surgeon to grasp the thread with a pair of forceps or other instrument so as to draw the end of the thread through. The end of the thread is held during the withdrawal of the needle after a portion of the thread is cut in advance of the needle so as to leave ends of sufficient length to be knotted in the manner well understood. By using a needle with a notch or open eye instead of the usual closed eye, the stitching may be continuous as will be readily understood.

The foregoing description and the draw ings have reference to what may be considered, the preferred or approved form of my invention. It is to be understood that I may make such changes in the construction, arrangement, and combination of parts, materials, dimensions, et cetera, as may prove expedient and fall within the scope of the appended claims.

Having thus fully described my invention, what I claim as new and desire to secure by Letters Patent, is:—

1. In a surgical instrument of the character specified, main members pivotally connected, an intermediate pivoted member, connecting means between the intermediate member and one of the main members to limit the relative movement of the members in one direction, and a spring connection between the intermediate member and one of the main members.

2. In a surgical instrument, main members pivotally connected, intermediate pivoted members, and a spring between each of the intermediate members and one of the main members.

3. In a surgical instrument of the character specified, pivoted main members, pivoted intermediate members, a bar having connection with one of the intermediate members, and a limited play with reference to the remaining intermediate member and the main members, and a spring between each of the intermediate members and one of the main members.

4. A surgical instrument of the character specified, comprising main members pivotally connected, intermediate pivoted members, a bar attached to one of the intermediate members, a pin and slot connection between said bar and the remaining intermediate member and each of the main members, and a spring between each of the intermediate members and one of the main members.

5. A surgical instrument of the character specified, comprising main members pivotally connected near one of their ends, intermediate members of a less length than the main members and pivoted co-axially therewith, the outer ends of the several members projecting to an equal distance, a curved bar attached to one of the intermediate members and having a pin and slot connection with the remaining intermediate member and with each of the main members, and a spring between each of the intermediate members and one of the main members.

6. A surgical instrument of the character specified, comprising main members pivotally connected near one of their ends, intermediate members of a less length than the main members and pivoted co-axially therewith, the outer ends of the several members projecting to an equal distance, a curved bar attached to one of the intermediate members and having a pin and slot connection with the remaining intermediate member and with each of the main members, a spring between each of the intermediate members and one of the main members, and means for adjusting the tension of each of the springs.

7. A surgical instrument of the character specified, comprising main members pivotally connected, intermediate members pivoted co-axially with the main members, one of the intermediate members having its outer end expansible to form a twin jaw, and the adjacent ends of the main and intermediate members being bent to provide jaws to co-act with the elements of the twin jaw, a bar attached to one of the intermediate members and having a pin and slot connection with the remaining intermediate member and with each of the main members, and a spring between each of the intermediate members and one of the main members.

8. A surgical instrument comprising pivoted main members, a needle at the outer end of one of the members, a guard at the outer end of the remaining member, intermediate members pivoted co-axially with the main members, a curved bar attached to one of the intermediate members and having a pin and slot connection with the remaining intermediate member and with each of the main members, and a spring between each of the intermediate members and one of the main members.

9. The herein described surgical instrument, comprising main members crossing and pivoted at the point of crossing, the handle ends of such members having openings to receive digits of the hand, a needle removably fitted to the outer end of one of the members, a guard at the outer end of the remaining member, a thread holder mounted upon one of the members, a curved rod and expansible helical spring between the handle ends of the members, intermediate members of less length than the main members and pivoted coaxially therewith, a curved bar attached to one of the intermediate members and having a pin and slot connection with the remaining intermediate member and with each of the main members, a spring between each of the intermediate members and one of the main members, and means for adjusting the tension of the springs.

In testimony whereof I affix my signature in presence of two witnesses.

HARRY SMIT.

Witnesses:
Chas. J. F. Bohlen,
Mary C. Flicker.